United States Patent [19]

Kato et al.

[11] 4,046,724
[45] Sept. 6, 1977

[54] FIREPROOF POLYESTER COMPOSITION

[75] Inventors: Yasuo Kato, Shiga; Katsuhiko Kato, Otsu; Masahiro Sugino, Otsu; Jun Ikegami, Otsu; Junichi Harukawa, Otsu, all of Japan

[73] Assignee: Toyo Boseki Kabushiki Kaisha, Osaka, Japan

[21] Appl. No.: 533,067

[22] Filed: Dec. 16, 1974

[30] Foreign Application Priority Data

Dec. 17, 1973 Japan .................. 48-141650

[51] Int. Cl.$^2$ .................. C08L 1/02; C08L 67/00
[52] U.S. Cl. .................. 260/9; 260/7.5; 260/75 H; 260/75 P; 260/45.7 P; 260/860
[58] Field of Search .................. 260/860, 75 H, 75 P, 260/45.7 P, 9, 7.5

[56] References Cited

U.S. PATENT DOCUMENTS

| | | | |
|---|---|---|---|
| 2,435,252 | 3/1948 | Toy .................. | 260/45.7 P |
| 2,572,076 | 10/1951 | Toy .................. | 260/45.7 P |
| 2,891,915 | 6/1959 | McCormack et al. .................. | 260/45.7 P |
| 3,794,617 | 2/1974 | Mains .................. | 260/47 C |
| 3,829,405 | 8/1974 | Cohen et al. .................. | 260/45.95 D |
| 3,830,771 | 8/1974 | Cohen et al. .................. | 260/40 R |
| 3,874,155 | 4/1975 | Knopka .................. | 57/140 |
| 3,874,157 | 4/1975 | Knopka .................. | 57/140 |
| 3,883,611 | 5/1975 | Nelson .................. | 260/860 |

*Primary Examiner*—Edward M. Woodberry
*Attorney, Agent, or Firm*—Birch, Stewart, Kolasch and Birch

[57] ABSTRACT

A polyester composition having high fireproofness is obtained by blending a copolymerized polyester comprising a polyalkylene terephthalate containing in the main chain thereof binding units of the formula:

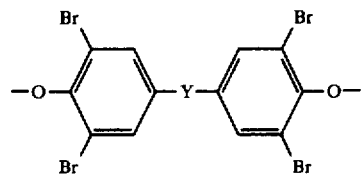

(wherein, Y denotes -O-, an alkylidene radical having 1 to 6 carbon atoms or a cycloalkylidene radical having 3 to 6 carbon atoms) with a high molecular weight organic phosphorus compound of the formula:

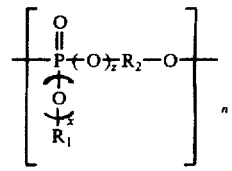

(wherein, $R_1$ denotes a monovalent hydrocarbon radical of 1 to 18 carbon atoms having or not having one or more substituents, $R_2$ denotes a divalent hydrocarbon radical of 2 to 20 carbon atoms having or not having one or more substituents, $x$ and $z$ each denote 0 or 1 and $n$ denotes an integer having the value of not less than 3) in an amount corresponding to 0.05 to 1.0% by weight of phosphorus atoms.

6 Claims, No Drawings

FIREPROOF POLYESTER COMPOSITION

FIELD OF THE INVENTION

This invention relates to a novel polyester composition possessed of high foreproofness.

BACKGROUND OF THE INVENTION

Generally, polyalkylene terephthalates represented by polyethylene terephthalate find extensive utility as, for example, in polyester type synthetic fibers but, they have a disadvantage that they are inflammable and, once they catch fire, they permit rapid spread of the fire. To eliminate this disadvantage, it has heretofore been proposed to incorporate organic phosphorus compounds such as phosphoric esters, phosphorous esters and phosphonic esters into the polyalkylene terephthalates or to have, during the preparation of polyalkylene terephthalates, such halogen compounds as tetrachlorophthalic anhydride and tetrabromophthalic anhydride used as part of the raw materials to afford copolymerized polyesters. The true state of affairs, however, is that such methods of the prior art cannot provide sufficient elimination of the aforementioned disadvantage.

In the circumstances described above, need has been felt for provision of polyesters or polyester compositions possessed of high fireproofness.

SUMMARY OF THE INVENTION

It is, therefore, an object of this invention to provide novel polyester compositions possessed of high fireproofness.

Other objects of this invention will become apparent from the following description of the invention.

In view of the circumstances described above, the inventors have conducted research on novel fireproof polyester compositions. They have consequently discovered that when, in the preparation of a polyalkylene terephthalate, a specific brominated compound of the type to be described hereinbelow is used as part of the raw material to afford a copolymerized polyester and a specific high molecular weight organic phosphorus compound to be described hereinbelow is blended with the copolymerized polyester, there is obtained a polyester composition possessed of high fireproofness.

This invention has been accomplished on this finding and, therefore, is characterized by blending a copolymerized polyester comprising a polyalkylene terephthalate containing in the main chain thereof binding units of the formula:

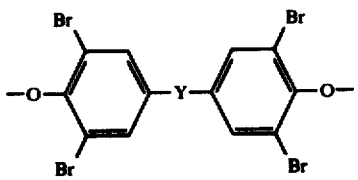

(wherein, Y denotes -O-, an alkylidene radical having 1 to 6 carbon atoms or a cycloalkylidene radical having 3 to 6 carbon atoms) with a high molecular weight organic phosphorus compound of the formula:

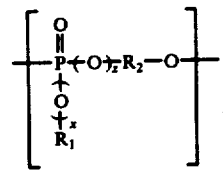

(wherein, $R_1$ denotes a monovalent hydrocarbon radical of 1 to 18 carbon atoms which is unsubstituted or substituted with one or more substituents, $R_2$ denotes a divalent hydrocarbon radical of 2 to 20 carbon atoms which is unsubstituted or substituted with one or more substituents, $x$ and $z$ each denote 0 or 1 and $n$ denotes an integer having the value of not less than 3) in an amount corresponding to 0.05 to 1.0% by weight of phosphorus atoms.

DETAILED DESCRIPTION OF THE INVENTION

The copolymerized polyester for use in the present invention comprising a polyalkylene terephthalate containing in the main chain thereof binding units of the formula:

(1)

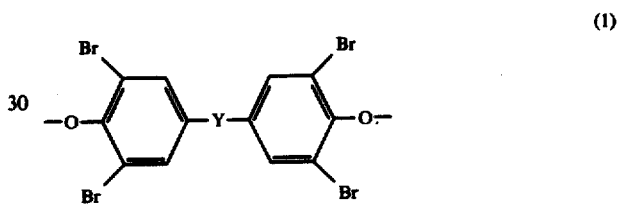

(wherein, Y denotes —O—, an alkylidene radical having 1 to 6 carbon atoms or a cycloalkylidene radical having 3 to 6 carbon atoms) is prepared by an ordinary method using an alkylene glycol, a dicarboxylic acid and a brominated compound of the type to be described hereinbelow. Examples of the alkylene glycol to be used in the preparation of this copolymerized polyester include ethylene glycol, propylene glycol, butane diol, etc. In conjunction with this alkylene glycol, there may be used 1,4-cyclohexane dimethanol, diethylene glycol, polyethylene glycol or ethylene thioglycol, though in a fractional amount. The term "dicarboxylic acid" is inclusive of terephthalic acid. In conjunction with terephthalic acid, there may be used isophthalic acid, 1,4-naphthalene dicarboxylic acid or some other aromatic dicarboxylic acid, though in a fractional amount. The brominated compound to be used in conjunction with the alkylene glycol and the dicarboxylic acid is one represented by the following generic formula:

(2)

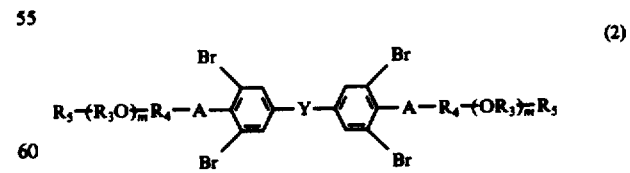

wherein, Y denotes —O—, an alkylidene radical of 1 to 6 carbon atoms or a cycloalkylidene radical having 3 to 6 carbon atoms, A denotes —O—,

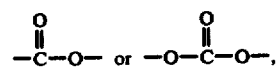

providing that when A is

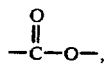

then the carbon atom in this radical is connected to $R_4$, $R_3$ and $R_4$ each denote a divalent hydrocarbon radical of 1 to 5 carbon atoms having or not having one or more substituents, $R_5$ denotes an esterforming radical selected from the class consisting of —OH, —COOH, —COCl, —COBr and —COOR$_6$ (where $R_6$ is a monovalent hydrocarbon radical of 1 to 10 carbon atoms) and $m$ denotes 0 or an integer having the value of 1 to 4. As examples of the brominated compound, there may be cited 2,2-bis[4-(2-hydroxyethoxy)-3,5-dibromophenyl]-propane, 2,2-bis[4-(3-hydroxypropoxy)-3,5-dibromophenyl]propane, 2,2-bis[4-(2-hydroxypropoxy)-3,5-dibromophenyl]propane, 2,2-bis[4-(4-hydroxybutoxy)-3,5-dibromophenyl]propane, bis[4-(2-hydroxyethoxy)-3,5-dibromophenyl] methane, 1,1-bis[4-(2-hydroxethoxy)-3,5-dibromophenyl]cyclohexane, bis[4-(2-hydroxyethoxy)-3,5-dibromophenyl]ether, 2,2-bis]4-(diethyleneglycoxy)-3,5-dibromophenyl]propane, 2,2-bis[4-(carbomethoxymethoxy)-3,5-dibromophenyl]propane, 2,2-bis[4-(2-carbomethoxyethoxy)-3,5-dibromophenyl]propane, 2,2-bis[4-(2-carboethoxyethoxy)-3,5-dibromophenyl]propane, 2,2-bis[4-(3-carbomethoxypropoxy)-3,5-dibromophenyl]propane, bis[4-(2-carbomethoxyethoxy)-3,5-dibromophenyl]methane, etc. These brominated compounds may be synthesized by an ordinary method. For example, 2,2-bis-[4-(2-hydroxyethoxy)-3,5-dibromophenyl]propane can be synthesized by the dehydrochlorination reaction between tetrabromo-bisphenol A and ethylene chlorohydrin or the addition of ethylene oxide to tetrabromo-bisphenol A. In order that the copolymerized polyester for use in the present invention comprising a polyalkylene terephthalate containing in the main chain thereof the binding units of the aforementioned generic formula (1) may have a large molecular weight and acquire outstanding physical properties, the brominated compound to be selected herein is desired to be of a type having satisfactory structural symmetry, namely a type such that in the aforementioned structure (2), $m$ is 0 or an integer of small value. In the present invention, therefore, it is desirable to use, as the brominated compound mentioned above, a 2,2-bis[4-hydroxyalkoxy-3,5-dibromophenyl]propane such as, for example, 2,2-bis[4-(2-hydroxyethoxy)-3,5-dibromophenyl]propane or 2,2-bis[4-(2-hydroxypropoxy)-3,5-dibromophenyl]propane. The amount of the brominated compound for use herein is required to be fixed so that the resultant copolymerized polyester will have a bromine content of 2 to 15% by weight, preferably 2 to 12% by weight. This range is critical. If the bromine content of the copolymerized polyester is less than the lower limit of 2% by weight, then blending of the copolymerized polyester with the high molecular organic phosphorus compound to be described afterward will not afford a desired polyester composition having high fireproofness. If the bromine content of the copolymerized polyester exceeds the upper limit of 15% by weight, then the copolymerized polyester has a melting point lower than is required and eventually fails to afford a fireproof polyester composition suited to practical use. The inclusion of the binding units of the aforementioned generic formula (1) into the main chain of the polyester by use of the brominated compound of the aforementioned generic formula (2) as one component for copolymerization may be accomplished by an ordinary method. For example, a method whereby the brominated compound may be added in conjunction with the other monomer into the reaction system either in the early stage of or after completion of the so-called interesterification involved during the preparation of the polyalkylene terephthalate, a method whereby said brominated compound is incorporated into the reaction system on termination of the initial stage of the so-called polycondensation reaction involved during the preparation of the polyalkylene terephthalate or any other desired method may be employed for the purpose. In the case of using a method whereby the addition of the brominated compounds is made at the latter stage of the polycondensation reaction, however, the amount of unaltered reactants which remains in the resultant copolymerized polyester is so large as to degrade the physical properties of the copolymerized polyester. Due precautions should be exercised, therefore, to avoid using such a disadvantageous method. In the course of the preparation of the copolymerized polyester, various modifiers such as pigments, antistatic agents, stabilizers and plasticizers may be added to the reaction system as occasion demands.

In the present invention, the copolymerized polyester described above is blended with a high molecular weight organic phosphorus compound of the generic formula:

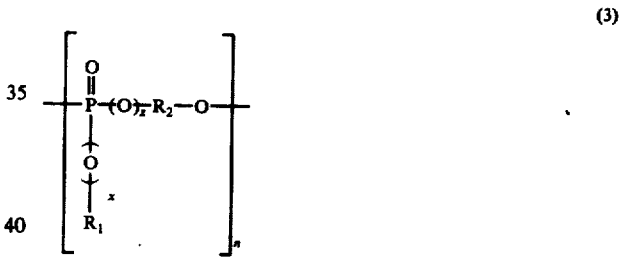

(3)

(wherein, $R_1$ denotes a monovalent hydrocarbon radical of 1 to 18 carbon atoms having or not having one or more substituents, $R_2$ denotes a divalent hydrocarbon radical of 2 to 20 carbon atoms having or not having one or more substituents, $x$ and $z$ each denote 0 or 1 and $n$ denotes an integer having the value of not less than 3). Concrete examples of $R_1$ in the generic formula (3) above include alkyls such as methyl, ethyl, n-propyl, isopropyl, n-butyl, tertiary butyl and n-pentyl; cycloalkyls such as cyclopentyl and cyclohexyl; aryls or alkyl aryls such as phenyl, cresyl, xylyl and naphthyl; and halogenated aryls such as p-chlorophenyl, o-chlorophenyl, p-bromophenyl, o-bromophenyl, 2,4,6-trichlorophenyl and 2,4,6-tribromophenyl. As concrete examples of $R_2$ in the generic formula (3) above, there may be cited arylene radicals or halogenated arylene radicals such as m-phenylene, p-phenylene, 2,5-dichloro-1,4-phenylene, 2,5-dibromo-1,4-phenylene, tetrachloro-1,4-phenylene and tetrabromo-1,4-phenylene; alkylene radicals or halogenated alkylene radicals such as ethylene, 1,4-butylene, 2,2-dichloromethyl-1,3-propylene and 2,2-dibromomethyl-1,3-propylene; biphenylene radicals such as 4,4'-biphenylene and 2,4'-biphenylene; and radicals represented by the generic formula:

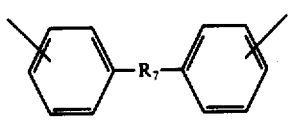

wherein, $R_7$ denotes a methylene, isopropylidene, cyclohexylidene, sulfonyl, carbonyl or ether radical and each benzene ring may contain up to four substituents such as the methyl radical, chlorine atom and bromine atom, for example.

Of the high molecular weight organic phosphorus compounds having the aforementioned generic formula (3), those which have, as $R_2$ in the structure of the formula, a radical containing as a component thereof one or more aromatic rings possessed, or not possessed, of one or more halogen atoms as a substituent or substituents are particularly advantageous for use in this invention. Specific examples are polyphosphonates and polyphosphates which have such repeating units as those enumerated below.

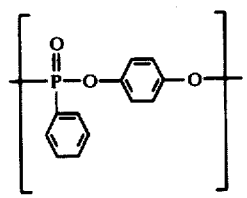

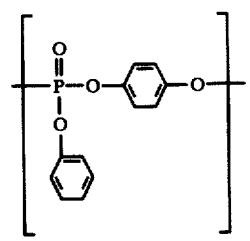

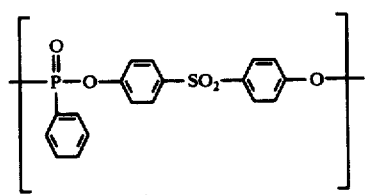

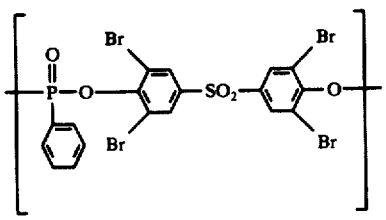

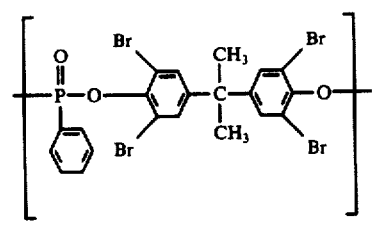

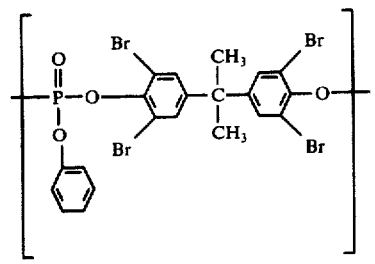

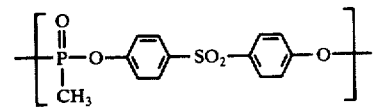

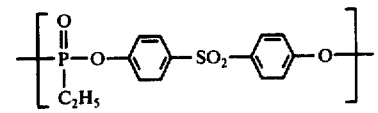

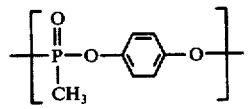

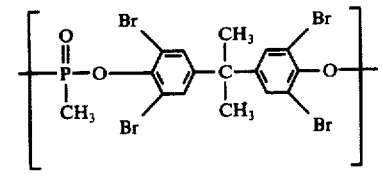

In the preset invention, it is desirable to use high molecular weight organic phosphorus compounds of which the number of repeating units or the value $n$ of the aforementioned formula (3) is not smaller than 3, preferably 5 to 100. In other words, it is advantageous to use high molecular weight organic phosphorus compounds having molecular weights of not less than 200, preferably 300 to 70000. If there is used a higher molecular weight organic phosphorus compound having a number of repeating units of more than 100, it offers inferior compatibility with the aforementioned copolymerized polyester when it is to be blended with the copolymerized polyester. Consequently, it is difficult to obtain as the final product a fireproof polyester composition proper for practical use. Thus, full attention should be paid to avoiding use of such higher molecular weight organic phosphorus compounds. When the high molecular weight organic phosphorus compound is combined with the aforementioned copolymerized polyester in the present invention, the proportion in which the blending is made is required to be such that the former compound is used in an amount corresponding to 0.05 to 1.0% by weight, preferably 0.1 to 0.8% by weight, of phosphorus atoms, although it is variable in relation to the bromine content in the copolymerized polyester composition, the degree of fireproofness of the polyester composition desired, etc. If the phosphorus compound is used in an amount corresponding to less than 0.05% by weight of phosphorus atoms, then the effect derivable from the addition of the high molecular weight organic phosphorus compound is no longer manifested. If it is used in an amount corresponding to more than 1.0% by weight of phosphorus atoms, the effect derived from the addition of the high molecular weight organic phosphorus compound is not proportionally increased but is decreased, and the physical properties of the resultant polyester composition are less satisfactory than are actually desired. When the aforementioned high molecular weight organic phosphorus compound is blended with the aforementioned copolymerized polyester, it is desired that they are mixed as homogeneously as possible. To the resultant polyester composition obtained by the blending, various additives such as pigments, stabilizers, plasticizers, fillers, etc. may be incorporated where necessary.

The fireproof polyester composition produced as described above can be utilized extensively for the production of various shaped articles such as fibers, films and boards. Particularly, because the composition can be melt spun, stretched and otherwise treated without entailing degradation of strength and other physical properties due to a decline in the polymerization degree of the polyester, it permits production of polyester fibers possessed of excellent properties and, in this respect, proves advantageous for use in fibers. Moreover, the aforementioned fireproof polyester composition has an advantage that the polyester fibers prepared therefrom, when mixed with nonfusible fibers (cellulose fibers such as cotton, hemp and rayon and proteinaceous fibers such as of wool and silk) give birth to yarns, mixed woven fabrics, mixed knit fabrics, nonwoven fabrics, papers, etc. which have good fireproofness. In this respect, the mixing ratio of the aforementioned polyester fibers to the aforementioned nonfusible fibers is desired to be such that the polyester fibers make up not less than 35% by weight based on the resultant mixture. Particularly, it is preferable to use cellulose fibers as the nonfusible fibers because cellulose fibers possess excellent properties.

A method for producing a fireproof polyester by using a low molecular weight organic phosphorus compound has been disclosed in the Official Gazette of Japanese Patent Publication No. 6616/1973, published on February 27, 1973, in Japan. If a low molecular weight organic phosphorus compound is used as proposed in this disclosure, there is a disadvantage that the organic phosphorus compound vaporizes and disperses during the spinning, particularly at the nozzle, to give contamination and dripping (the phenomenon in which the vaporized phosphorus compound adheres to the nozzle surface and, as the deposited vapor accumulates to a certain extent, falls off in drips to entail operational obstacles). In addition, the fireproof polyester to be obtained by use of the aforementioned low molecular weight organic phosphorus compound also has a disadvantage that, when it is dyed at elevated temperature and thereafter treated in the subsequent stages, the phosphorus compound exudes from within the fibers and diffuses into the bath to contaminate the bath and lower the yield. By use of the aforementioned high molecular weight organic phosphorus compound, the present invention permits preclusion of the various disadvantages involved in the use of low molecular weight organic phosphorus compound and improves the fireproofness to be attained.

The present invention, therefore, is believed to contribute greatly to the textile industry in particular.

The present invention will be described in further detail by citing preferred embodiments hereinbelow. This invention is not to be considered as being limited by these examples. In the examples, the percents are by weight. The tests for intrinsic viscosity and fireproofness as dealt with in these examples were carried out in accordance with the following methods:

1. Intrinsic viscosity:

The measurement of this property was carried out at 30° C by using a solvent having phenol and 1,1,2,2-tetrachloroethane mixed at a weight ratio of 6:4.

2. Fireproofness (match test method):

With a fireproof cotton yarn or a fireproof polynosic rayon yarn, a polyester filament obtained by melt spinning the polyester composition to produce an as-spun yarn and stretching the as-spun yarn by an ordinary method were uniformly intertwisted, with the ratio of the cotton yarn or the rayon yarn to the polyester filament fixed at 35:65 by weight. The intertwisted yarn obtained had a linear density of 0.009 g/cm. This intertwisted yarn was cut to a length of 15 cm and hung. A flame of a lighted match was brought into direct contact with the lower end of the yarn to set fire to the yarn. Thereafter, the flame source was taken away and the intertwisted yarn was kept under observation to determine whether it would manifest a self-extinguishing property or not. The self-extinguishing property was rated by the following scale:

⊙ - The flame immediately became extinct when the flame source was removed from the yarn.

O - Although the flame remained after the flame source had been removed, it became extinct before the entire length of 15 cm of the yarn was burned out.

x - The flame remained until the entire length of the yarn was burned out.

FIREPROOF COTTON YARN

A fireproof cotton yarn, 60 cotton counts, with a phosphorus content of 1.8% by weight, was prepared by an ordinary preliminary fireproofing treatment using Pyrovatex CP (made by Ciba Geigy).

FIREPROOF POLYNOSIC YARN

After dispersing polyphosphate of the chemical formula as shown below into viscose, polynosic staple having a phosphorus content of 2.5 weight % was obtained by spinning, stretching, crimping, cutting and drying. The resultant polynosic staple was used to produce 40 cotton counts yarn for testing.

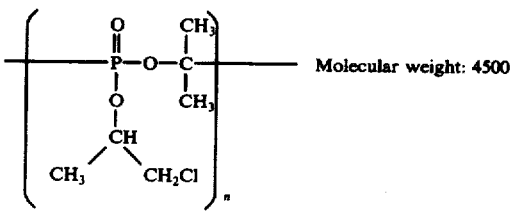

Molecular weight: 4500

EXAMPLE 1

Bis(2-hydroxyethyl) terephthalate synthesized in advance and a prescribed amount of 2,2-bis[4-(2-hydroxyethoxy)-3,5-dibromophenyl]propane were subjected to polycondensation by an ordinary method at 270° C and 0.5 mmHg, using as the polycondensation catalyst antimony trioxide in an amount corresponding to 0.04% by weight based on the former compound. After the end of the polycondensation, the system was returned to normal pressure and then mixed with a different kind of high molecular weight phosphorus compound indicated in Table 1 in a prescribed amount and blended in situ by agitation for 15 minutes under a flow of nitrogen gas. The polyester composition consequently formed was extruded through the fine orifice formed at the bottom of the polymerization tube by virtue of the pressure of nitrogen gas and the yarn thus extruded was taken up on a roll to obtain an as-spun yarn. The intrinsic viscosity of this as-spun yarn is shown in Table 1. The as-spun yarn was tested for fireproofness as described hereinbelow.

EXAMPLE 2

Dimethyl terephthalate, ethylene glycol and a prescribed amount of 2,2-bis[4-(2-carbomethoxy methoxy)-3,5-dibromophenyl]propane were subjected to interesterification by an ordinary method at 150° C - 210° C, using as the catalyst, zinc acetate in an amount corresponding to 0.035% by weight based on dimethyl terephthalate. The reaction product of the interesterification was removed into an autoclave and, in the presence of antimony trioxide which was added thereto as the polycondensation catalyst, in an amount corresponding to 0.040% by weight based on the original dimethyl terephthalate, subjected to polycondensation by an ordinary method at 270° C and 0.3 mmHg. By following the procedure of Example 1 from this point on, the polycondensation product was combined with a prescribed amount of a high molecular weight phosphorus compound to produce a polyester composition, from which the as-spun yarn indicated in Table 1 was produced. This as-spun yarn was tested for fireproofness as described hereinbelow.

COMPARATIVE EXAMPLE 1

The procedure of Example 1 was repeated, except that the low molecular weight phosphorus compounds shown in Table 2 were used in the prescribed amounts in place of the high molecular weight phosphorus compounds. Consequently there was obtained the as-spun yarns shown in Table 2. These as-spun yarns were tested for fireproofness as described hereinbelow.

Table 1

| Example No. | As-spun yarn | Brominated compound in copolymer | | Amount of phosphorus compound blended | | | Intrinsic viscosity |
|---|---|---|---|---|---|---|---|
| | | (mol%) | Bromine content in copolymerized polyester (%) | Name of compound (symbol) | (Weight %) | Phosporus content (%) in composition | |
| 1 | A | 4 | 6.2 | a | 4 | 0.55 | 0.56 |
| | B | 4 | 6.2 | b | 4 | 0.32 | 0.56 |
| | C | 4 | 6.4 | c | 4 | 0.19 | 0.57 |
| | D | 4 | 6.3 | d | 4 | 0.18 | 0.54 |
| 2 | E | 4 | 5.3 | a | 4 | 0.53 | 0.51 |

Table 2

| Comparative Example No. | As-spun yarn | Brominated compound in copolymer | | Amount of phosphorus compound blended | | | Intrinsic viscosity |
|---|---|---|---|---|---|---|---|
| | | (mol%) | Bromine content in copolymerized polyester (%) | Name of compound (symbol) | (weight %) | Phosphorus content (%) in composition | |
| 1 | F | 4 | 6.3 | e | 4 | 0.38 | 0.51 |
| | G | 4 | 6.2 | e | 6 | 0.55 | 0.50 |
| | H | 4 | 6.3 | f | 4 | 0.40 | 0.57 |

(Note)
The phosphorus compounds given in Table 1 and Table 2 are shown in Table 3 in terms of structural formulas or repeating units.

Table 3

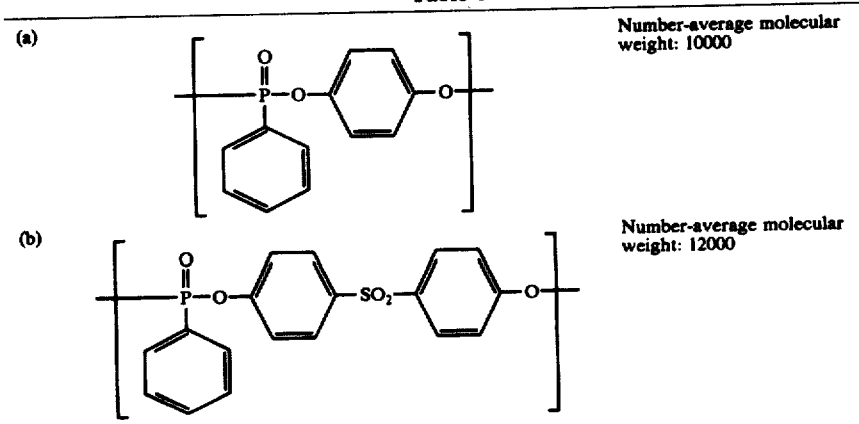

(a) Number-average molecular weight: 10000

(b) Number-average molecular weight: 12000

Table 3-continued

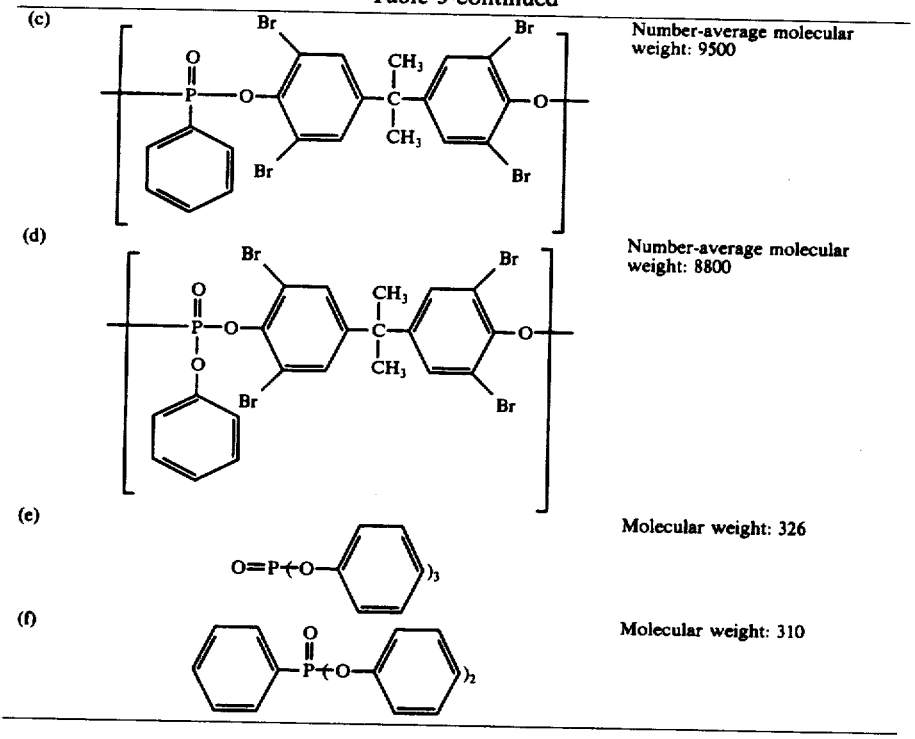

The as-spun yarns A through H obtained in Examples 1 and 2 and Comparative Example 1 and shown in Tables 1 and 2 were tested for fireproofness in accordance with the match test method described previously. The results are shown in Table 4.

Table 4

| | Undrawn yarn | Fireproofness |
|---|---|---|
| Example 1 | A | ⊚ |
| | B | ⊚ |
| | C | ⊚ |
| | D | ⊚ |
| Example 2 | E | ⊚ |
| Comparative | F | X |
| example 1 | G | X~O |
| | H | X |

This table shows that the as-spun yarns A through E prepared according to this invention possess a much more excellent fireproof property than the as-spun yarns F through H of the comparative example.

EXAMPLE 3

Interesterification was effected by using 550 g of dimethyl terephthalate, 352 ml of ethylene glycol, 0.17 g of zinc acetate dihydrate and 0.23 g of antimony trioxide. After the end of this reaction, the system was stirred with 0.28 g of phenyl phosphonic acid and 1.9 g of titanium oxide (dispersed in ethylene glycol) was added thereto for 10 minutes. The product was placed in conjunction with a different brominated compound as indicated in Table 5 (brominated compounds (1) through (3)) in an autoclave and subjected to polycondensation at 270° C and 0.3 mmHg for 150 minutes. The resultant polymer was finely cut to be used as the specimen for the following spinning test. The properties of the resin thus produced are shown in Table 6.

The powdered copolymerized polyester shown in Table 6 and a different organic phosphorus compound, (a) - (f), indicated in Table 3 were mixed. The resultant mixture was placed in a test tube having a fine orifice provided at the bottom. It was dried for 15 hours under conditions of 110° C and 0.1 mmHg and thereafter blended for 20 minutes at 275° C under the flow of nitrogen gas. The blend thus formed in the test tube was spun by being extruded through the fine orifice under the pressure of nitrogen gas, with the tube kept at 270° C. The as-spun yarn was drawn by an ordinary method. The drawn yarn was tested for fireproofness by following the metch test procedure described previously. The results of the fireproofness test by the match test method are shown in Table 7.

EXAMPLE 4

The procedure of Example 1 was faithfully repeated, except that the compound (4) of Table 5 was used in the prescribed amount at the initial stage of the esterification. The results obtained in this case are shown in Table 6.

COMPARATIVE EXAMPLE 2

The powdered copolymerized polyesters obtained in Example 3 and Example 4 were each placed in a test tube provided with a fine orifice and treated by following the procedure of Example 3. The results obtained in this case were as shown in Table 7.

COMPARATIVE EXAMPLE 3

The powdered copolymerized polyesters obtained in Example 3 and Example 4 and preliminarily dried were mixed with the phosphorus compounds indicated in Table 3. The resultant mixtures were each placed in a test tube provided with a fine orifice, dried for 15 hours under conditions of 66° - 70° C and 0.1 mmHg and then blended, spun and drawn by repeating the procedure of Example 3 and the resultant drawn yarns were tested for fire-proofness by the match test method. The results are shown in Table 7. In this case, phosphorus compounds were observed to vaporize and disperse in the course of spinning.

EXAMPLE 5

In an interesterification reactor, 12000 g of dimethyl terephthalate, 8400 g of ethylene glycol, 3.6 g of zinc acetate dihydrate and 7.2 g of antimony trioxide were put together to undergo interesterification. After the end of the reaction, the system was agitated with 6.1 g of phenyl phosphonic acid and 41.5 g of titanium oxide (dispersed in ethylene glycol) was added thereto for 10 minutes and it was further agitated for 10 minutes with 2050 g of the compound (1) of Table 5. The reaction product was removed into a polycondensation reactor. The temperature was gradually elevated from 220° C and the pressure was lowered in the meantime. In 100 minutes, the temperature rose to 270° C and the pressure fell to 0.3 mmHg. The system was maintained under these conditions for 70 minutes. Thereafter, the system was returned to normal pressure by means of nitrogen gas, extruded through the fine orifice provided at the bottom and cut to give pellets. The pellets had a bromine content of 7.0% and an intrinsic viscosity of 0.61.

Under conditions of 120° C and 0.1 mmHg, 950 g of said pellets and 50 g of the compound (a) of Table 3 were mixed for 16 hours and the mixture was dried. The resultant dry mixture was melted, mixed and extruded at 275° C to give pellets once again. The new pellets had a bromine content of 6.7%, a phosphorus content of 0.42% and an intrinsic viscosity of 0.62.

The copolymerized polyester pellets containing the phosphorus-containing polymer were dried for 16 hours under the conditions of 120° C and 0.1 mmHg and thereafter spun at 275° C by using an extruder provided with a 24-hole nozzle. The resultant as-spun yarn was elongated to 420% to produce the drawn yarn shown in Table 8. The drawn yarn was tested for fireproofness in accordance with Method B-2 specified in JIS K-7201-1972. The results are shown in Table 8 in terms of limiting oxygen index (LOI). The staple shown in Table 9 was obtained by subjecting this drawn yarn to the steps of crimping and cutting. This staple, prepared in accordance with the Note to Table 9, was tested for fireproofness in accordance with Method B-1 specified in JIS K-7201-1972. The results were as shown in Table 9 in terms of limiting oxygen index (LOI).

COMPARATIVE EXAMPLE 4

By following the procedure of Example 5, filaments and staples were prepared from the copolymerized polyester alone of Example 5 and from the mixture of said polyester with 5% of the compound (e) of Table 3. The test results obtained thereby are shown in Table 8 and Table 9.

COMPARATIVE EXAMPLE 5

By following the procedure of Example 5, a filament and a staple were prepared from the mixture of a polyethylene terephthalate obtained by an ordinary method (intrinsic viscosity 0.62) with 5% of the compound (a) of Table 3. The test results obtained thereby were as shown in Table 8 and Table 9.

Table 5

| Symbol | Structural formula |
|---|---|
| (1) | 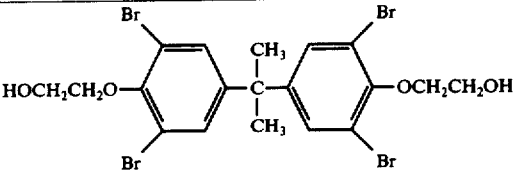 |
| (2) | 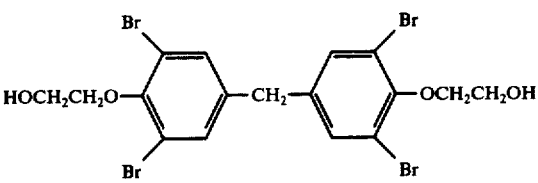 |
| (3) | 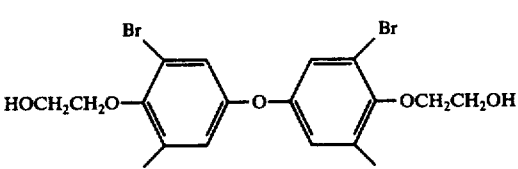 |
| (4) | 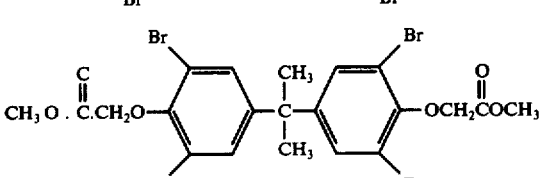 |

Table 6

| Brominated compound | Amount added (mol%) | Bromine content in resin | Intrinsic viscosity |
|---|---|---|---|
| (1) | 5.0 | 7.0 % | 0.61 |
| (2) | 5.0 | 7.1 % | 0.60 |
| (3) | 5.0 | 7.3 % | 0.60 |
| (4) | 5.0 | 6.9 % | 0.59 |

Table 7

| | Brominated compound | Phosphorus compound | Amount added (wt%) | Yarn | Fireproofness |
|---|---|---|---|---|---|
| Example 3, 4 | (1) | (a) | 6 | C | ◉ |
| | | | 6 | R | ◉ |
| | | (b) | 6 | C | ◉ |
| | | | 6 | R | ◉ |
| | | (d) | 6 | C | ◉ |
| | | | 6 | R | ◉ |
| | (2) | (c) | 6 | C | ◉ |
| | | | 6 | R | ◉ |
| | (3) | (d) | 6 | C | ◉ |
| | | | 6 | R | ◉ |
| | (4) | (a) | 6 | C | ◉ |
| | | | 6 | R | ◉ |
| Comparative example 2, 3 | (1) | — | 0 | C | X |
| | | | 0 | R | X ~O |
| | | (e) | 6 | C | X ~O |
| | | | 6 | R | X ~O |
| | (2) | — | 0 | C | X |
| | | | 0 | R | X ~O |

Table 7-continued

| Brominated compound | Phosphorus compound Amount added (wt%) | Yarn | Fireproofness |
|---|---|---|---|
| | (f) 6 | C | X ~O |
| | 6 | R | X ~O |
| (3) | — 0 | C | X |
| | 0 | R | X |
| | (e) 6 | C | X ~O |
| | 6 | R | X ~O |
| (4) | — 0 | C | X |
| | 0 | R | X ~O |
| | (f) 6 | C | X ~O |
| | 6 | R | X ~O |

C: Fireproof cotton
R: Fireproof polynosic

Table 8

| Brominated compound Amount added (mol%) | Phosphorus compound Amount added (wt%) | Denier | Dry strength (g/d) | Dry elongation (%) | LOI (or OI) value (%) |
|---|---|---|---|---|---|
| (1) 5 | (a) 5 | 75 | 4.3 | 31 | 34.0 |
| | (e) 5 | 74 | 3.9 | 28 | 32.0 |
| | — 0 | 74 | 4.4 | 30 | 31.5 |
| — 0 | (a) 5 | 75 | 4.4 | 32 | 30.0 |

(Note) Polyester 100%
The drawn polyester yarn was knitted with a socks-knitting machine to produce the test sample.

Table 9

| Brominated compound Amount added (mol%) | Phosphorus compound Amount added (wt%) | Denier | Dry strength (g/d) | Dry elongation (%) | Cut length (mm) | Weight of fabric (g/m²) | LOI (or OI) % |
|---|---|---|---|---|---|---|---|
| (1) 5 | (a) 5 | 1.5 | 4.0 | 32 | 38 | 152 | 18.25 |
| | (e) 5 | 1.5 | 3.5 | 30 | 38 | 158 | 17.25 |
| | — 0 | 1.5 | 4.2 | 30 | 38 | 150 | 16.75 |
| — 0 | (a) 5 | 1.5 | 4.3 | 33 | 38 | 155 | 16.00 |

(Note) Polyester cotton blend:
A blended spun yarn, 40 cotton counts, was produced with fireproof polyester staple and cotton. The ratio of the staple to the cotton was 65 : 35 (by weight). The resultant blended spun yarn was treated, after being knitted with a socks-knitting machine, by way of the fireproof treatment procedure as shown below to produce a test sample. The test of contacting with a flame was begun at the lower part of the test sample.

FIREPROOF TREATMENT

This treatment was conducted according to the following steps (1) to (5).

1. Eliminating oil from fabric.

A knitted fabric was shaken for 30 minutes at 70° C in an aqueous solution containing 1g/l of nonionic surfactant at a bath ratio of 1 : 40 and, thereafter, washed and dried.

2. Padding

The knitted fabric was immersed into an aqueous solution containing 45% of Pyrovatex CP (made by Ciba Geigy), 8% of hexamethoxymethylmelamine, 1% of urea, 0.5% of ammonium chloride, and 0.3% of non-ionic surfactant and, thereafter, pressed out with a roller.

3. Drying

For 13 minutes at 85° C.

4. Curing

The knitted fabric was left one night after heating thereof for 5 minutes at 175° C.

5. Soaping

The knitted fabric was immersed for 35 minutes at 90° C into an aqueous solution containing 2g/l of $Na_2CO_3$ at a bath ratio of 1 : 40 (g/l) and, thereafter, washed at 40° C with hot water, then washed at room temperature and dried.

What is claimed is:

1. A fireproof polyester composition comprising a blend of (1) a copolymerized polyester comprising a polyalkylene terephthalate containing in the main chain thereof binding units of the formula:

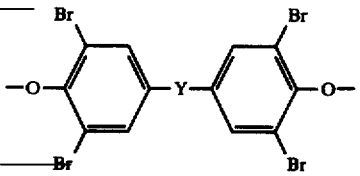

wherein Y denotes an oxygen atom, an alkylidene radical having 1 to 6 carbon atoms or a cycloalkylidene radical having 3 to 6 carbon atoms, the bromine content in said copolymerized polyester being from 2 to 12% by weight, with (2) a high molecular weight organic phosphorus compound of the formula:

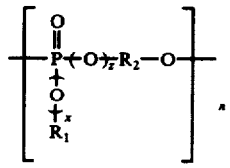

wherein $R_1$ denotes a monovalent hydrocarbon radical of 1 to 18 carbon atoms which is unsubstituted or substituted with one or more substituents, $R_2$ denotes a divalent hydrocarbon radical of 2 to 20 carbon atoms which is unsubstituted or substituted with one or more substituents, x and z each denote 0 or 1 and n is an integer of 5 to 100, the amount of organic phosphorus compound in said blend being such as to correspond to 0.1 to 0.8% by weight of phosphorus atoms.

2. The fireproof polyester composition of claim 1, wherein the bromine content in said copolymerized polyester is from 2 to 15% by weight.

3. The fireproof polyester composition of claim 1, wherein the molecular weight of said high molecular weight organic phosphorus compound falls within the range of from 300 to 70000.

4. Fireproof polyester fibers obtained by shaping the fireproof polyester composition as set forth in claim 1.

5. A fireproof fibrous product obtained by mixing the fireproof polyester fibers as set forth in claim 4 with nonfusible fibers.

6. The fireproof fibrous product of claim 5, wherein said nonfusible fibers are cellulose fibers.

* * * * *